US009162652B2

(12) United States Patent
Belanger et al.

(10) Patent No.: US 9,162,652 B2
(45) Date of Patent: Oct. 20, 2015

(54) CAR WASH SPRAY ARCH (71) Applicant: Belanger, Inc., Northville, MI (US)

(72) Inventors: Michael J. Belanger, Northville, MI (US); Barry S. Turner, Novi, MI (US); David L. Tognetti, Howell, MI (US); Mark D. Morin, Plymouth, MI (US)

(73) Assignee: Belanger, Inc., Northville, MI (US)

( * ) Notice: Subject to any disclaimer, the term of this patent is extended or adjusted under 35 U.S.C. 154(b) by 163 days.

(21) Appl. No.: 13/847,513

(22) Filed: Mar. 20, 2013

(65) Prior Publication Data

US 2013/0291909 A1 Nov. 7, 2013

Related U.S. Application Data (60) Provisional application No. 61/642,840, filed on May 4, 2012.

(51) Int. Cl.
*B60S 3/04* (2006.01)

(52) U.S. Cl.
CPC .......................................... *B60S 3/04* (2013.01)

(58) Field of Classification Search
CPC ............ B05B 15/1203; B05B 15/1296; B05B 17/085; B05B 13/0278; B05B 13/0405; B05B 15/066; B65G 45/22; B65G 47/844; B60S 3/04; B60S 3/002; B60S 3/044; A61G 2007/0509; A61G 2007/0513; A61G 2007/0516
USPC .......... 134/56 R, 181, 180; 118/323; 239/752
See application file for complete search history.

(56) References Cited

U.S. PATENT DOCUMENTS

| | | | | |
|---|---|---|---|---|
| 651,828 | A | * | 6/1900 | Copland ............................ 74/54 |
| 3,701,356 | A | * | 10/1972 | Hanna et al. ................. 134/58 R |
| 4,788,993 | A | * | 12/1988 | Beer et al. ...................... 134/123 |
| 2010/0154843 | A1 | * | 6/2010 | Ennis ............................. 134/123 |

* cited by examiner

*Primary Examiner* — Michael Barr
*Assistant Examiner* — Tinsae Ayalew
(74) *Attorney, Agent, or Firm* — Young Basile Hanlon & MacFarlane P.C.

(57) ABSTRACT

A shape-changing spray arch for a "touchless" spray washer for automotive vehicles and the like. A transit frame which can change shape is mounted in a fixed arch frame and connected to an actuator which changes the shape of the side and top spray conduits in a reciprocal fashion as vehicles pass through the arch. In addition, the spray conduits, both side and top conduits, can be twisted or reoriented around their respective longitudinal axes to be aimed more toward an approaching vehicle and then reoriented to be aimed more toward a receding vehicle, the change in angular orientation being effected as the vehicle passes through the arch. These features can be used separately or in combination.

11 Claims, 7 Drawing Sheets

CAR WASH SPRAY ARCH

CROSS REFERENCE TO RELATED APPLICATION

This application claims the benefit of U.S. provisional patent application Ser. No. 61/642,840 filed May 4, 2012.

FIELD OF THE INVENTION

This application discloses a car wash spray arch by which spray nozzles aimed at the exterior surfaces of vehicles passing through the arch can be reoriented to direct fluids at the vehicles from different angles during a single washing operation.

BACKGROUND OF THE INVENTION

It is known to provide spray systems for car washes; i.e, so-called "touchless" washers that remove dirt by directing water and water/chemical solutions through nozzles toward a vehicle. One such spray system is disclosed in RE 40,463 assigned to Belanger, Inc. of Northville, Mich. where a vertically depending spray arm moves around a vehicle standing in a fixed location. Other spray systems can be mounted on an arch, either fixed as in the case of a tunnel wash, or movable as in the case of a rollover washer. In both cases, the aiming directions of the nozzles remain generally fixed relative to the target surfaces.

SUMMARY OF THE DISCLOSURE

A car wash spray features disclosed herein provides spray nozzles for wash and/or rinse fluids that can be reoriented as to spray direction in the course of a wash operation. The specific embodiment disclosed herein accomplishes this function in several ways to provide features which can be used or incorporated into a spray system collectively or individually. The first of these features is the provision of supply pipes or conduits carrying spray nozzles, which pipes or conduits can be reciprocally swiveled or rotated about their respective longitudinal axes so as to vary the angle at which the various nozzles mounted on the conduits direct fluids toward an adjacent vehicle during relative movement between the vehicle and the conduit. The spray system can, by way of example, include two, spaced-apart side conduits which are more or less vertically arranged, and a top structure that may also be a conduit arranged more or less horizontally. The side and top structures/conduits may be interconnected to form an arch and to allow for a single fluid input to both side and top conduits. The conduits also form an arch through which vehicles may pass in the case of a conveyor washer. The conduits may be mounted to a frame in such a way as to allow them to be positioned at a first angle about their respective longitudinal axes during the approach of a vehicle and then rotated to a second angle as the vehicle continues through the spray pattern and moves past it. While this single nozzle reorientation during a vehicle wash is disclosed as the illustrative embodiment, the nozzles may alternatively be programmed to swivel back and forth repeatedly during a wash. The change in angle may vary, but a ±30° direction change is preferred.

In an illustrative embodiment hereinafter described in greater detail, the side and top conduits are metal pipes interconnected by means of flexible couplings at the upper left and right corners of the arch so they can be twisted or swiveled in unison to change nozzle direction. In this arrangement, only one power actuator is needed to produce the described changes in the angular orientation of the conduits and the nozzles carried thereby. As described herein, the twisting reorientation of the spray conduits can be a two-position "flip" system, but can also be structured and programmed to provide three or more discrete positions or, if preferred, a smooth, continuous reciprocating change in position between the opposite end positions. As used herein, the term "twist" refers to rotation of a conduit or supply pipe about its own longitudinal axis and does not infer a helical distortion of the conduit or pipe material.

Another feature of the spray system described herein is the provision of a function whereby a spray arch having side and top nozzle conduits changes shape during a wash operation. In the illustrative embodiment, this function is produced by a relatively simple motor-driven crank arrangement connected between a fixed support frame and the top (horizontal) arch conduit to simulate the back and forth rocking motion that would be produced by, for example, a ten or twelve foot pendulum arm used to suspend the upper conduit from a high pivot point. This changes nozzle aiming directions as well as distances-to-target, but in a different way from the conduit twisting function described above. The nozzle conduits may be advantageously carried by elements connected together to form a "transit frame" as explained herein.

If the side spray conduits are mechanically connected to the top or horizontal spray conduit, the side conduits experience a reciprocating reorientation; i.e., the side conduits sway back and forth and move up and down as the top conduit rocks. The overall effect is an oscillatory or reciprocating movement of all of the spray nozzles in both the top and side conduits to continuously change the overall shape of the transit frame from a left-leaning rhomboid to a right-leaning rhomboid and back again, with a generally upright rectangular shape between the left and right leaning shapes. This shape-changing movement can be combined with the conduit twisting action described above. Alternatively, it can be used by itself.

In the embodiment used to illustrate the features and advantages of the spray arch, the structure comprises a fixed arch-shaped support frame adapted to be permanently mounted in a car wash building or area. The fixed frame comprises uprights which are parallel and spaced apart on opposite sides of a path of vehicle travel so as to accommodate the passage of vehicles therebetween. The uprights are mechanically interconnected to a cross-beam structure which is high enough off of the floor to permit vehicles to pass thereunder. The fixed frame can be made up of multiple beams, typically hollow aluminum box beams, so as to provide a strong and attractive support structure tolerant of the environment which is typical of vehicle washing operations.

The transit frame described above is mounted to and generally within the fixed frame. The transit frame comprises the combination of left and right upright members and a cross-arm connected between the upright members. The movable transit frame elements are necessarily interconnected to one another at the upper corners in such a way so as to permit the frame to change shape as described above; e.g., pivotal connections are provided. The top frame member rocks back and forth under the control of a crank arrangement which is anchored to the fixed frame along the top arm thereof. Any other fixed support can be used for this purpose but the support frame provides a convenient location. Cam-shaped slides are mounted at the corners of the fixed frame and receive rollers connected the top left and right corners of the movable transit frame members so as to program the motion which gives rise to the changing shape and position of the transit frame as the crank moves the top arm back and forth; i.e., the top frame member of the transit frame not only moves left and right but also experiences a rocking motion in which the left and right corners alternately move up and down through several inches of travel.

The spray conduits and associated nozzles are carried by the transit frame. In fact, the conduits and the transit frame are essentially a single unit. In the illustrated embodiments, mechanical brackets are used as stand-offs along the length of both the top and side arms of the transit frame so that the spray conduits can be attached to the transit frame to be carried along with it during its reciprocating travel cycle. The power actuator which produces the twisting motion is anchored to the top arm of the transit frame and the power piston is connected to the top conduit in the spray conduit setup by way of a crank arm to produce the desired twisting motion. The rocking motion of the transit frame is produced by a motor-driven crank assembly mounted to the fixed frame.

A spray arch as described above can be implemented in a number of different ways including a static frame embodiment which incorporates only the twisting motion, and a transit frame embodiment which exhibits the rocking motion described above, both with and without the twisting motion, also described above. The transit frame may be enclosed within an aesthetically pleasing cover structure which can be illuminated by LED lighting systems, as hereinafter shown and described in greater detail.

The above description and the following detailed description assume the arch is stationary and the vehicles pass through it while being driven by a conveyor. However, the principles of spray movement disclosed herein may also be applied to rollover or carriage type washers wherein the conduits move and the vehicle is stationary during the wash operation.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Referring to the FIGS. 1-5, a spray arch for washing vehicles V is shown to comprise an arch-shaped, fixed frame 10 which, in this case, is permanently mounted to the floor 12 of the car wash facility and of such size as to permit vehicles V to be washed to pass through and under the fixed frame while being propelled along a path of vehicle travel by, for example, a conventional tunnel car wash conveyor. It will be appreciated, however by persons skilled in the art, that much of the description provided herein can also be applied to drive-through washers and gantry type rollover car wash systems wherein the fixed frame 10 is, for example, provided with wheels and mounted for longitudinal movement so as to permit it to be moved back and forth relative to a stationary vehicle. In that respect, the term "fixed" as it refers to the frame 10 implies only that the frame is fixed in its overall configuration and does not necessarily convey the meaning that it is immovable relative to its environment.

In the figures, the fixed frame 10 comprises double parallel upright metal beams 14, arranged in pairs on each side of the frame. These beams 14 may be made of many materials but are preferably hollow aluminum beams. The beams can have an oval, square or rectangular cross-section. Parallel cross beams 16 are fastened by bolted assembly brackets to complete the arch and provide a rigid structure capable of tolerating the weights and inertial forces created by the additional structure described hereinafter.

Mounted generally within the fixed frame 10 is a transit frame 18, the term "transit" implying that the frame 18 changes shape and position during a typical car wash operation, as hereinafter described. The transit frame 18 comprises left and right side arms 20 which are more or less vertical and a top cross-arm 22 connected at its left and right ends to the tops of the side arms 20 by pivot structures including sets of plastic rollers 24. The rollers 24 are actually cam followers as they are mounted within cam slots 25 formed in slide members 26 which are bolted, welded or otherwise fixed to the upper corners of the fixed frame 10 to define the direction and range of motion through which the structural elements of the transit frame move during a typical operation hereinafter described.

A rocking motion of the transit frame 18 is produced by a crank system including a motor 28 mounted to the top beams 16 of the fixed frame 10. Again, the motor 28 could be mounted on any fixed support but the top beam of the frame 10 is convenient for this purpose. The motor 28 is connected to a two-part crank arrangement 30 which, in turn, is connected at 29 to the top arm 22 of the transit frame 18 so as to cause the top arm 22 of the transit frame, and anything carried by it, to rock back and forth as if it were suspended from an overhead pendulum arm having a fulcrum point approximately 12' above the center of the top arm 22 of the transit frame 18. The slides 26 accommodate the rocking motion and program or guide the transit frame during its cyclical motion relative to the fixed frame 10. The lower ends of the transit frame arms 20 are provided with pivotal slide structures 44 which allow several inches of vertical movement as well as angular changes. Simple pivotal slides may also be used. The side arms 20 of the transit frame rise and fall through a range of about 4-8" and sway back and forth relative to the fixed frame 10 during a complete cycle of the rocking motion imparted to the upper arm 22 of the transit frame 18 as shown in FIGS. 1-3.

Figure 1:
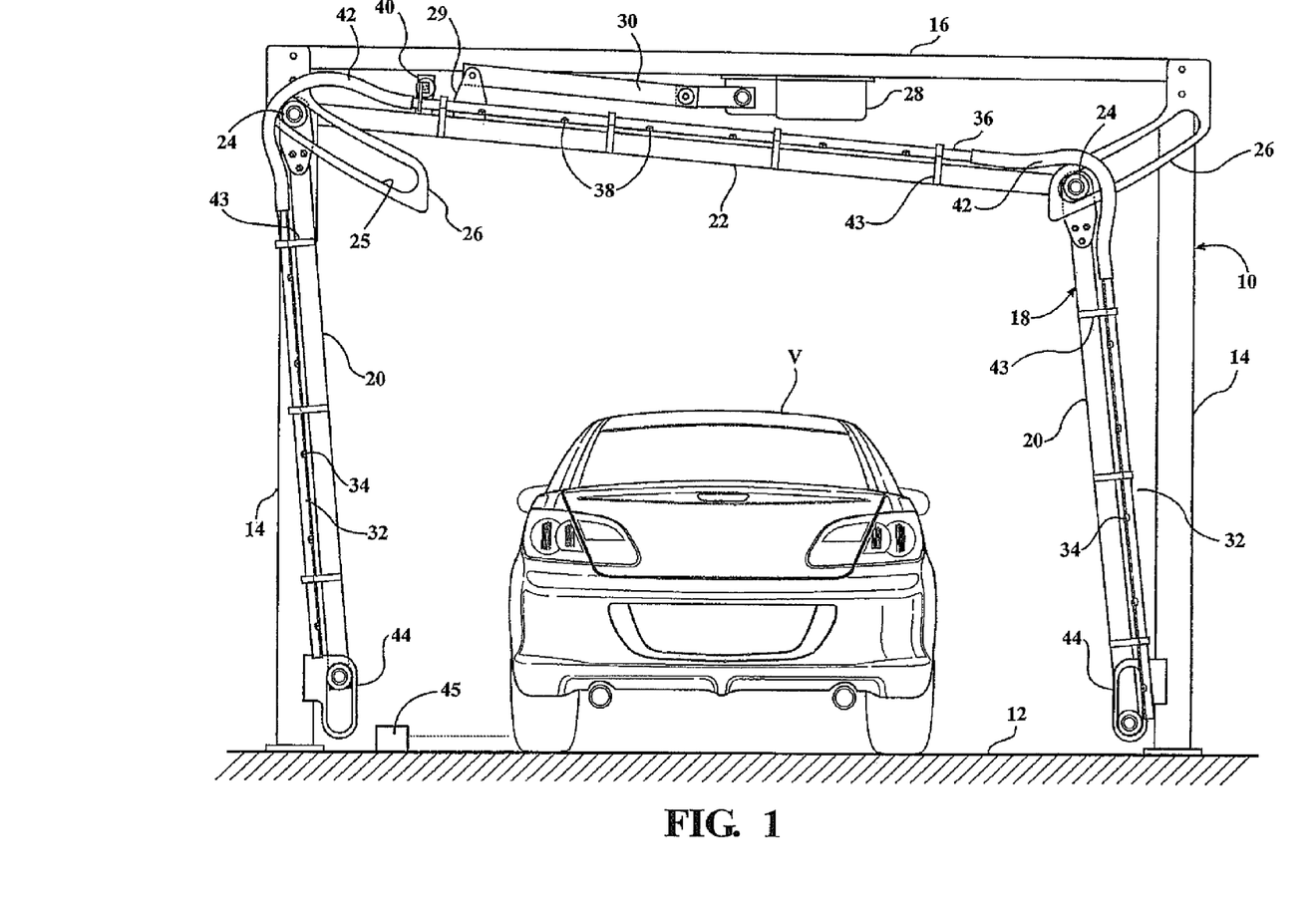
FIG. 1 is a rear view of an automobile passing through a spray arch according to the present disclosure with the transit frame and spray arms in a first orientation.

In FIG. 1, the left arm 20 is in a full upright position and leaning left while the right arm 20 is in a full downward position. The resulting geometric figure is left-leaning wherein the top of the geometric figure is non-horizontal. In FIG. 2, the arms 20 both point downwardly. The frame arm 22 is level. The resulting shape shown in FIG. 2 is that of a regular upright rectangle. In FIG. 3, the frame arm 22 is lower on the left side, the side arm 20 is fully down and leaning right while the right arm 20 is fully upright but also leaning to the right.

The transit frame 18 carries a spray system consisting of left and right side fluid conduits 32 having generally inwardly aimed spray nozzles 34 and an overhead or top conduit 36 having generally downwardly directed nozzles 38. The top conduit 36 is interconnected for both fluid flow and mechanical integrity with the side conduits 32 by means of flexible couplings 42 shown in FIG. 4. These couplings are hollow rubber tubes so as to carry fluid, reinforced so as to be capable of transmitting torque from a twisting top conduit 36 to a twistable side conduit 32 as hereinafter described. All of the conduits 32, 36 can be metal pipes, plastic pipes or relatively stiff reinforced rubber tubes, metal being preferred because metal facilitates the installation of threaded nozzles 34 using a drilling and tapping operation.

Figure 2:
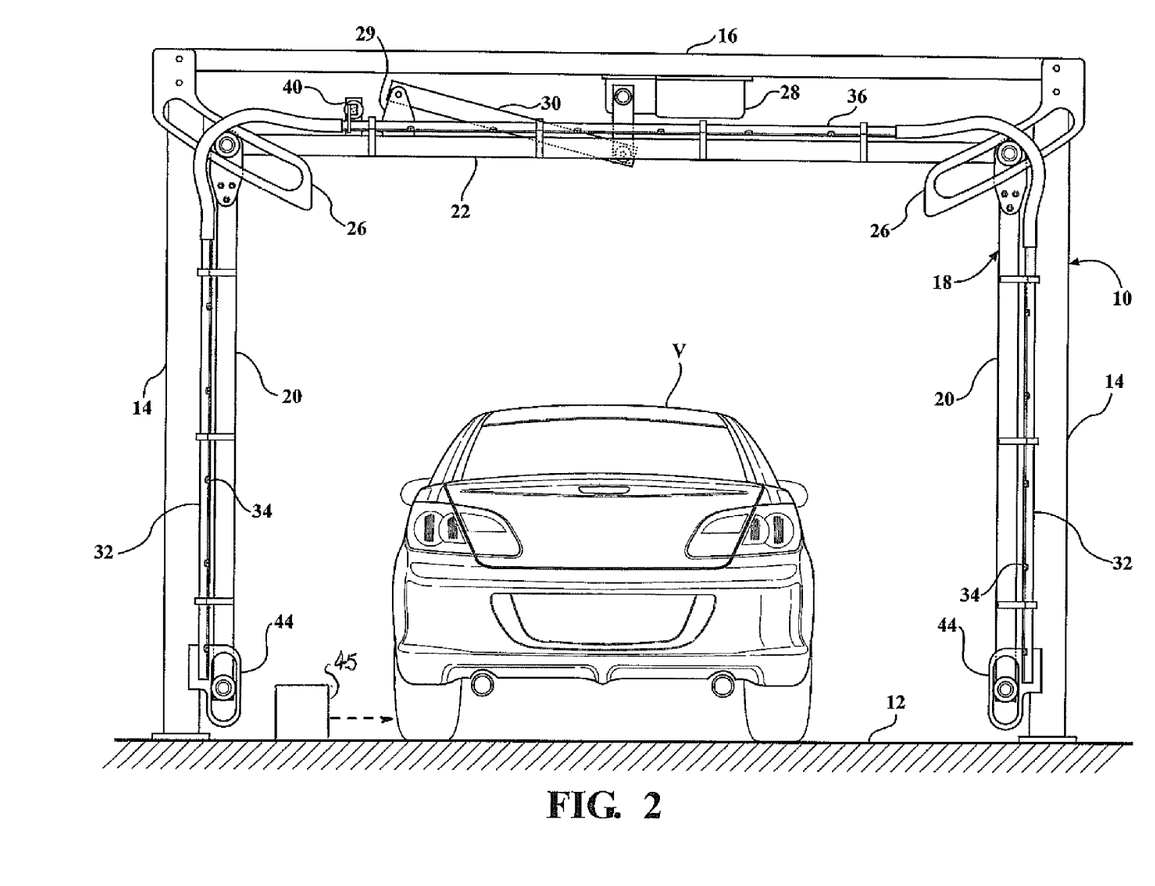
FIG. 2 is a view similar to FIG. 1 but with the transit frame and spray arms in a centered position.
Figure 3:
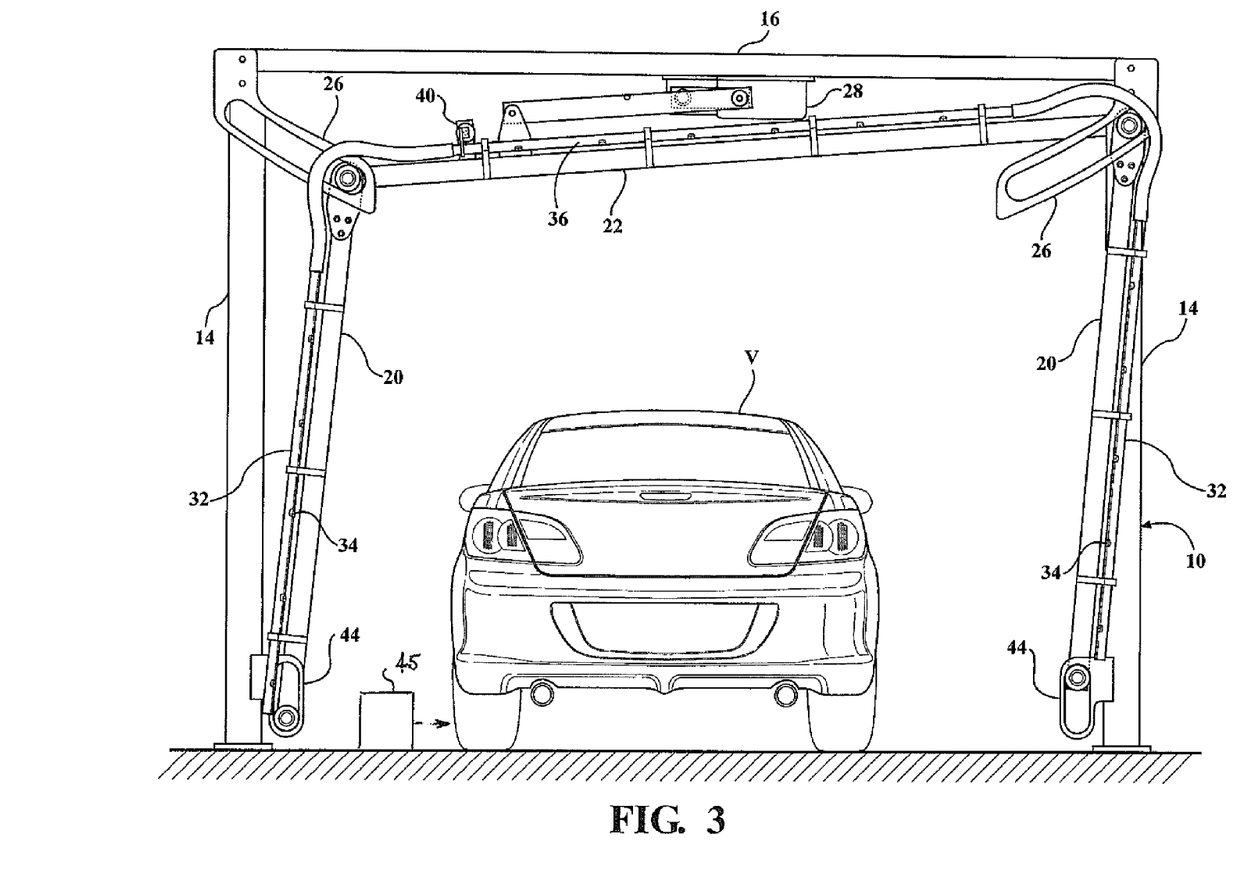
FIG. 3 is a view similar to FIGS. 1 and 2 but with the transit frame moved to the far right position.
Figure 4:
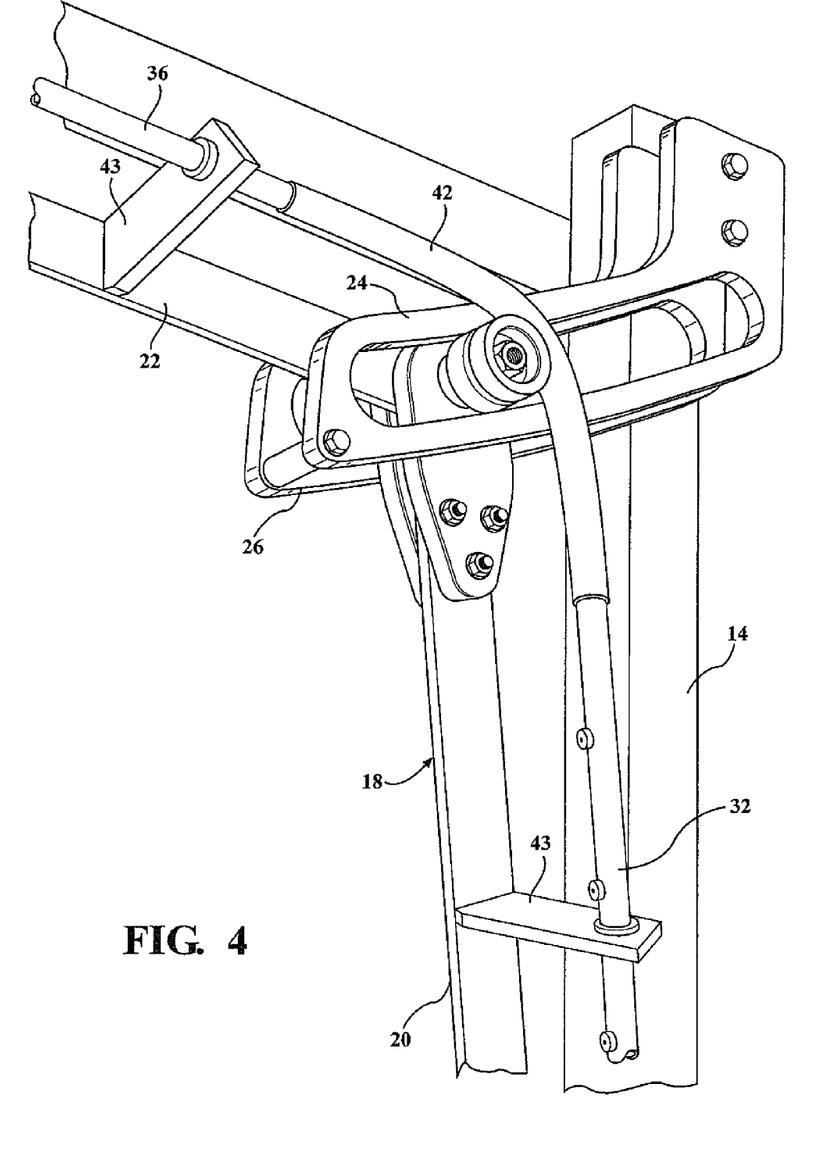
FIG. 4 is a perspective view of a corner detail showing how the transit frame is connected to the fixed frame by way of a cam and follower mechanism.

As shown in FIGS. 1-3, the conduits 32 and 36 are mounted relative to the side and top beams of the transit frame by means of metal stand-offs 43 having bushings to permit the conduits to be twisted or changed in orientation so as to direct the spray patterns from the nozzles 34 in either of two directions, one being generally toward an approaching vehicle passing through the arch along the floor 12 and the other being generally aimed more toward a receding vehicle as it continues its progress through the arch. The transition from one spray nozzle orientation to the other occurs at a predetermined point, such as when the side-mounted rear view mirrors pass the side structures 14 of the arch 10 as sensed by an electric eye or sonic sensor 45 or a touch wand connected to a limit switch or a suitable control system smart enough to know the position and length of a vehicle. The orientation change can also occur when the rear tire of the vehicle reaches the side nozzles.

The top conduit 36 is also mounted to the upper structural members 22 of the transit frame by means of stand-offs 43 also having bushings to permit twisting of the conduit 36 to reorient the nozzles 38 through an angular travel of about 60°; i.e., plus and minus 30° from neutral, so as to be first aimed toward an approaching vehicle and, as the vehicle is about half-way through the arch, switched 60° to an orientation which tends to follow a receding vehicle. In this way, fluids are directed toward the front of an approaching vehicle and toward the rear of a receding vehicle. The change in nozzle direction need not be exactly at the halfway point. A sensor 45 detects vehicle position to trigger the switch.

The twisting motion of the conduits 36, 32 is produced by an air cylinder actuator 40 which is mounted to the top structural arm 22 of the transit frame 18 and connected to the conduit 36 by way of a crank arm. The air cylinder 40 is connected to a suitable high-pressure air supply by flexible plastic conduits in a conventional fashion and triggered by a control system as generally described above. The twisting motion which is applied to the conduit 36 is transmitted through the couplings 42 to the side conduits 32 so that all of the conduits 36, 32 move in unison while at the same time washing and/or rinsing fluids are conveyed through the conduits to the nozzles 34, 38 to wash a vehicle in the desired fashion.

In summary, the arch provides a timed change in side and top nozzle orientation in two ways: first, the aiming direction of the nozzles 34 relative to the vehicle V changes about 60° as the vehicle passes through the arch 10; second, the transit frame 18 sways and changes shape continuously in a parallelogram motion changing not only the orientations of the spray conduits but the distances between the nozzles and the vehicle as well.

Figure 5:
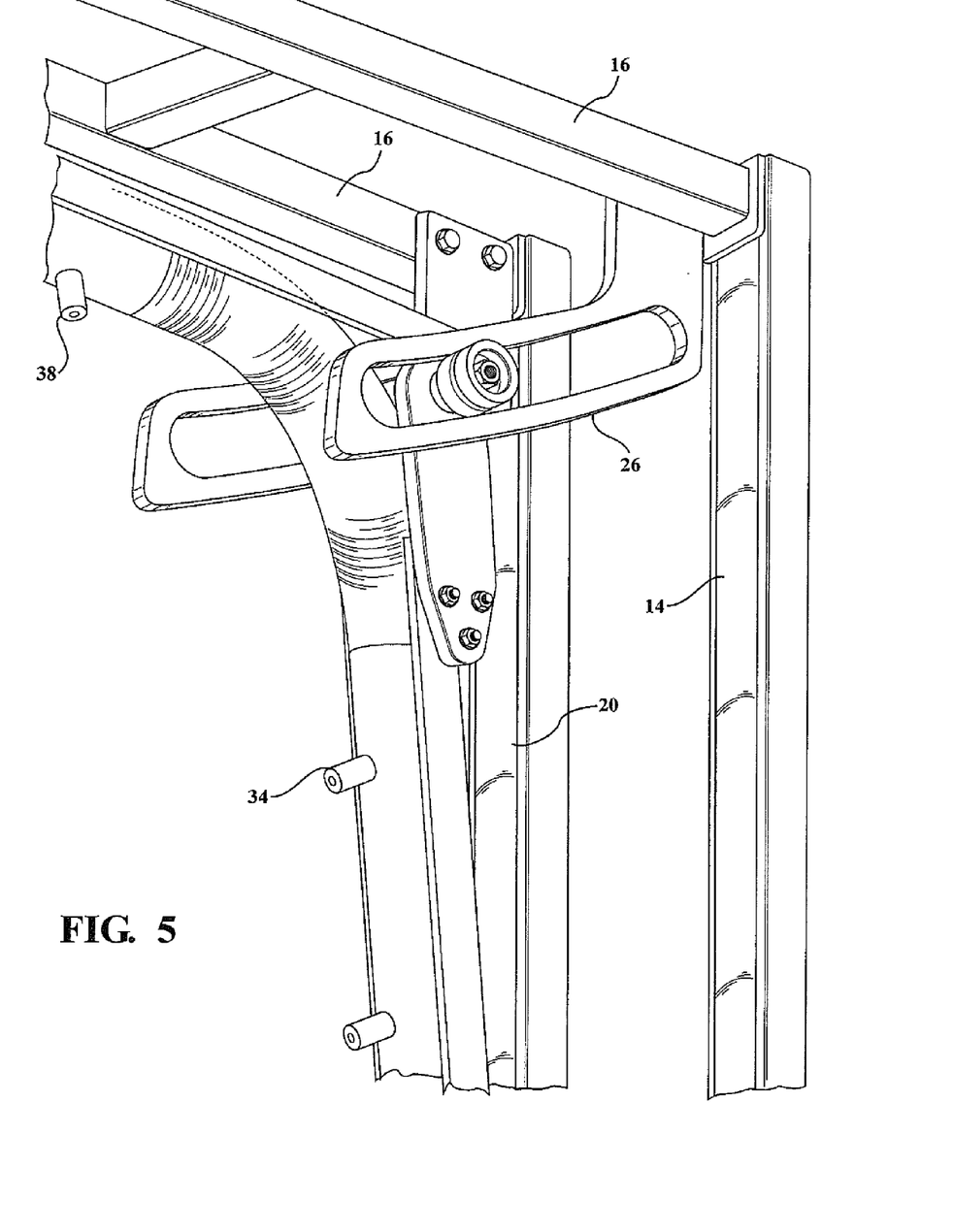
FIG. 5 is a perspective view of an arch corner similar to that of FIG. 4 but with decorative housings on the transit frame.
Figure 6:
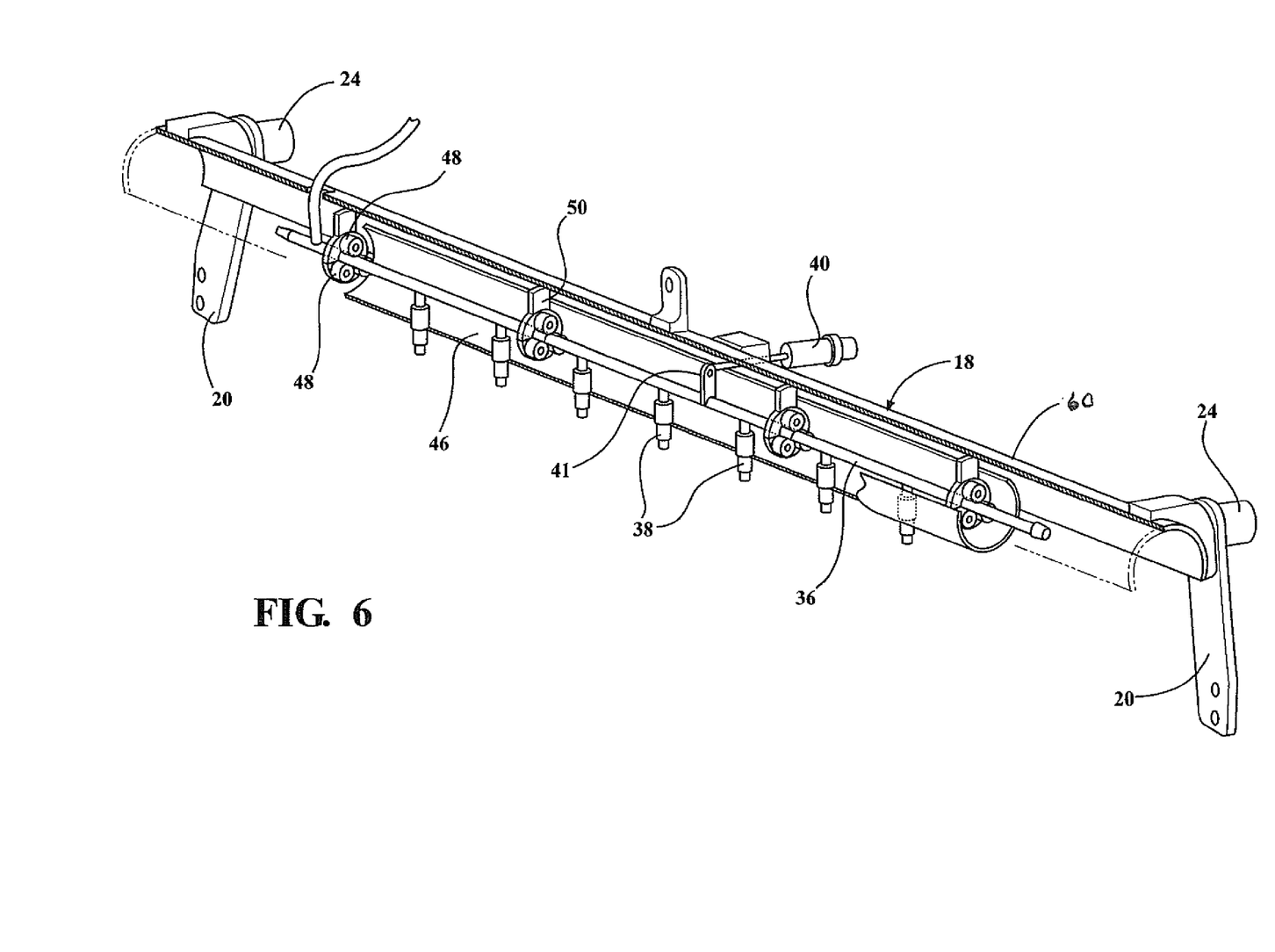
FIG. 6 is a perspective view of a transit frame top member with a two-part tubular housing surrounding the fluid conduit.
Figure 7:
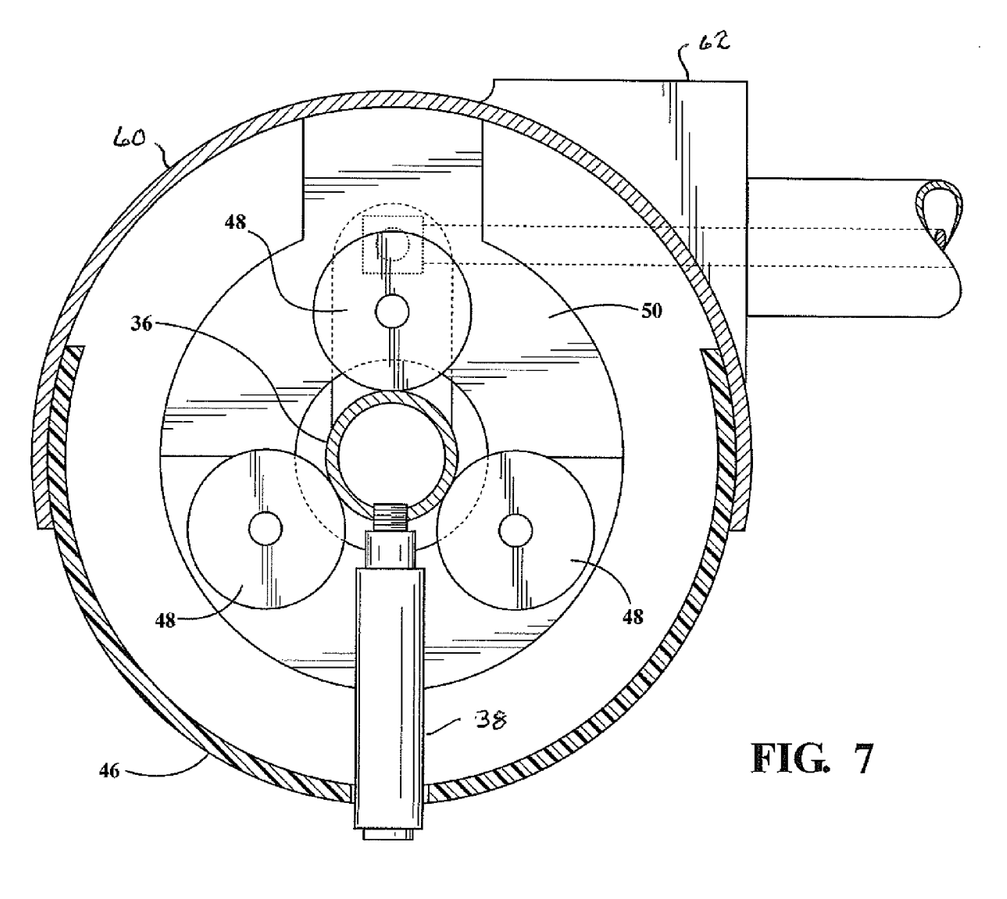
FIG. 7 is a sectional view through the top member of FIG. 6 showing how the parts of the tubular housing slide relative to one another as the conduit and nozzles change direction.

As shown in the computer drawings FIGS. 5 through 7, the aesthetics of the unit may be improved by constructing the transit frame to include partially translucent plastic housings 46 which enclose the spray conduits but have openings for the nozzles 34 and 38. To accommodate the twisting action of the conduits 32, 36, brackets 50 carry three spaced rollers 48 that grip the conduits 36. The housings comprise an aluminum half-cylinder 60 mounted by brackets 62 to the transit frame. Slidingly mounted within the fixed half-cylinder 60 is a translucent half-cylinder 46 with longitudinally-spaced openings that allow nozzles 38 to extend therethrough. The circumferential sweep of half-cylinder 46 is about 220°. As the conduit 36 rotates or "twists" about its own longitudinal axis, the sleeve-like half-cylinder 46 is carried along, slidingly rotating within the aluminum body provided by half-cylinder 60. LED strips may be mounted within the housings to illuminate them along their lengths in an aesthetically pleasing way, suitable lighting systems being described in the co-pending applications, Ser. Nos. 13/025,466 and 12/707,777, incorporated herein by reference.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A car wash spray arch for directing fluids toward vehicles passing through the arch comprising:
   a left side substantially upright fluid conduit with multiple spray nozzles mounted thereon in spaced apart relationship along the longitudinal axis of said conduit;
   a right side substantially upright conduit with multiple spray nozzles mounted at spaced locations along the longitudinal axis of said right side spray conduit;
   a horizontal conduit extending between the upper ends of said upright conduits to form an inverted U-shaped arch of such size as to permit a conventional passenger vehicle to pass between said left side and right side conduits; said nozzles being arranged to direct fluids inwardly of such arch as a vehicle passes there through; and
   an actuator system for reciprocally changing the vertical orientations of the left and right fluid conduits in concert through an angle of travel while maintaining a parallel relationship there between, thereby to reciprocally change the shape of the arch from a left leaning rhomboid to a right leaning rhomboid and back again while fluids are being dispensed from the spray nozzles said rhomboids always being of such size as to permit a conventional passenger vehicle to pass there between during the change of shape of the arch.

2. The spray arch defined in claim 1 wherein the horizontal conduit has multiple spray nozzles arranged in spaced apart relationship along the longitudinal axis thereof; and wherein all the spray nozzles associated with the left and right conduits and the cross-member conduit are aimed inwardly of the arch such that the spray directions of fluids from the nozzles change reciprocally as the arch changes shape; said arch further comprising means for reciprocally rotating the conduits about their own longitudinal axes.

3. A car wash spray arch for directing fluids at vehicles passing through the arch comprising:
   a static frame comprising left and right fixed vertical support members and a fixed horizontal cross-member connected between the upper ends of the vertical support members to form an inverted U-shaped arch of such size as to permit a conventional passenger vehicle to pass between said vertical support members and under said horizontal cross member;

a transit frame comprising left and right parallel and generally upright frame members, each carrying a conduit with plural spaced apart spray nozzles mounted thereon for directing fluids inwardly of the arch said transit frame also being of such size as to permit a conventional passenger to pass between the left and right parallel and generally upright frame members during a carwash operation; said spray nozzles being aimed inwardly of said arch to direct fluids toward a vehicle passing through the arch;

said transit frame being mounted within said static frame members to allow limited movement of said transit frame members relative thereto; and an actuator system for reciprocally changing the angular orientation of said left and right frame members relative to vertical in unison while dispensing inwardly of the arch fluid from said nozzles thereby to change the positions from which fluids are dispensed toward a vehicle surface passing through said static transit frames during the displacement of the conduits.

4. The spray arch as defined in claim 3 wherein the transit frame further comprises a horizontal frame member connected between the upper ends of the left and right vertical frame members to form an arch, the lateral sides of which sway reciprocally under the influence of said actuator system; the conduits carried by the transit frame members being interconnected to form a continuous fluid path.

5. A spray arch as defined in claim 4 wherein the actuator system comprises slide connections between the static frame and the left and right transit frame members whereby operation of the actuator system causes the transit frame arch to change shape.

6. A spray arch as defined in claim 5 wherein the sliding connections and the actuator system are configured to cause the left and right vertical frame members to reciprocally lean inwardly and outwardly in unison and to move vertically relative to the static frame in opposition to one another thereby to produce a rocking motion of said horizontal frame member while fluids are being dispensed from the nozzles located in the fluid conduits.

7. A spray arch as defined in claim 3 further comprising a second actuator for reciprocally rotating the left and right spray conduits about their longitudinal axes during the dispensing of fluid therefrom.

8. A stationary car wash spray arch comprising:

a static frame comprising left and right fixed and parallel support members and a top cross-member fixedly connected between said left and right vertical support members said static frame being of such size as to permit a conventional passenger vehicle to pass between said left and right fixed and parallel support members and under said top cross member without contact there between;

a transit frame carrying a substantially continuous fluid conduit system containing left and right substantially upright members and an overhead substantially horizontal member pivotally interconnected with said left and right substantially upright members, said transit frame members carrying a continuous fluid conduit with spray nozzles distributed there along; said transit frame being of such size as to permit a conventional passenger vehicle to pass between said left and right substantially uprights members without contact therewith; said nozzles being oriented so as direct fluid therefrom inwardly of said transit frame toward a vehicle passing there through;

first actuator means for reciprocally and repeatedly changing the shape of the transit frame by leaning the upright members reciprocally left and right while dispensing fluids from said nozzles; and a second actuator system for rotating the fluid conduit about its own longitudinal axis.

9. A spray arch as defined in claim 8 wherein the first actuator means comprises a crank arm and motor connected to the transit frame for rocking the transit frame to change its shape in parallelogram fashion; said static frame defining left and right upper corners thereof at the intersections of the left and right uprights, respectively, and the horizontal member, said static frame further carrying downwardly and inwardly projecting cam members at the upper corners thereof with sliding cam surfaces therein, said transit frame having cam follower means at the pivotal connections thereof operating in said sliding cam surfaces during the shape-changing parallelogram motion of the transit frame.

10. A spray arch as defined in claim 8 wherein the second actuator means comprises a linear actuator mounted on the transit frame and connected to said fluid conduit system for reciprocally and repeatedly rotating the fluid conduit system about its own longitudinal axis.

11. A car wash spray arch comprising:

a static frame comprising fixed vertical left and right support members and a top member fixedly connected between the tops of the left and right vertical support members to define a generally inverted U-shaped frame of fixed size and shape wherein the fixed size is such as to permit a conventional passenger vehicle to pass through the static frame between the left and right vertical support members and under the top member without contact with said members;

a shape-changeable transit frame comprising parallel and generally upright left and right rigid arms and a cross arm pivotally connected between said arms, said transit frame generally lying within the static frame; said transit frame at all times being of such sizes to permit a conventional passenger vehicle to pass between the generally upright left and right rigid arms and under the cross arm pivotally connected there between without contact of same;

a fluid conduit system carried by the transit frame and comprising a continuous, generally U-shaped arrangement of left and right side conduits and a top conduit joining the left and right side conduits, a series of spaced-apart nozzles disposed in said fluid conduits along the entire length thereof for dispensing fluids toward an automobile passing through the transit frame; and an actuator for reciprocally and repeatedly changing the shape of the transit frame in parallelogram fashion between a left-leaning rhomboid and a right-leaning rhomboid, said actuator comprising a power source connecting said static frame with the transit frame and a pair of cam members fixed to said static frame and capturing said transit frame at the upper left and right corners thereof.

\* \* \* \* \*